United States Patent
Demange et al.

(10) Patent No.: US 9,902,437 B2
(45) Date of Patent: Feb. 27, 2018

(54) SPOILER FOR A TAILGATE OF A MOTOR VEHICLE

(71) Applicant: Compagnie Plastic Omnium, Lyons (FR)

(72) Inventors: Jean-Yves Demange, Amberieu en Bugey (FR); Philippe Coudron, Caluire & Cuire (FR); Bertrand Hache, Saint Cyr (FR); Martin Struss, Bratislava (SK); Samuel Coutanceau, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/917,308

(22) PCT Filed: Sep. 5, 2014

(86) PCT No.: PCT/FR2014/052204
§ 371 (c)(1),
(2) Date: Mar. 8, 2016

(87) PCT Pub. No.: WO2015/033077
PCT Pub. Date: Mar. 12, 2015

(65) Prior Publication Data
US 2016/0221614 A1    Aug. 4, 2016

(30) Foreign Application Priority Data

Sep. 9, 2013   (FR) ..................................... 13 58659

(51) Int. Cl.
*B62D 35/00* (2006.01)
*B60J 5/10* (2006.01)
*B62D 29/04* (2006.01)

(52) U.S. Cl.
CPC .............. *B62D 35/007* (2013.01); *B60J 5/10* (2013.01); *B62D 29/04* (2013.01)

(58) Field of Classification Search
CPC .......... B60J 5/10; B62D 29/04; B62D 35/007; B62D 35/008; B62D 37/02
(Continued)

(56) References Cited

U.S. PATENT DOCUMENTS 5,360,253 A * 11/1994 Sasaki .................. B62D 35/007
296/152
7,490,891 B2 * 2/2009 Terakawa ............. B62D 35/007
296/146.8
(Continued)

FOREIGN PATENT DOCUMENTS

DE    102008026131 A1    12/2008
DE    102012101897 A1 *  9/2013    ........... B62D 35/007
(Continued)

OTHER PUBLICATIONS

English translation of DE 10 2012 101 897; retreived Nov. 14, 2016 via PatentTranslate located at www.epo.org.*
(Continued)

*Primary Examiner* — Jason S Daniels
(74) *Attorney, Agent, or Firm* — Harness, Dickey & Pierce, P.L.C.

(57) ABSTRACT

The invention relates to a spoiler for a tailgate of a motor vehicle, wherein the spoiler comprises: a custom skin providing the spoiler with an external appearance and projecting towards the rear of the vehicle so as to improve the aerodynamics of the vehicle; and an element for reinforcing the custom skin, which is secured to the custom skin, comprising means for attaching to the tailgate, and comprising towards the rear of the vehicle at least one recess which can accommodate technical equipment.

11 Claims, 2 Drawing Sheets

(58) Field of Classification Search
USPC .......................................... 296/180.1, 180.2
See application file for complete search history.

(56) References Cited

U.S. PATENT DOCUMENTS

| | | | |
|---|---|---|---|
| 7,878,577 B2* | 2/2011 | Thomas | B62D 35/007 |
| | | | 296/180.1 |
| 8,419,099 B2* | 4/2013 | Inoue | B62D 35/007 |
| | | | 24/297 |
| 2008/0301898 A1 | 12/2008 | Katou et al. | |
| 2010/0026045 A1 | 2/2010 | Thomas | |
| 2013/0223091 A1 | 8/2013 | Inubushi | |

FOREIGN PATENT DOCUMENTS

| | | |
|---|---|---|
| DE | 202012102063 U1 | 9/2013 |
| EP | 2620355 A1 | 7/2013 |
| FR | 2932767 A1 | 12/2009 |

OTHER PUBLICATIONS

International Search Report PCT/ISA/210 for International Application No. PCT/FR2014/052204 dated Jan. 19, 2015.
Written Opinion of the International Searching Authority PCT/ISA/237 for International Application No. PCT/FR2014/052204 dated Jan. 19, 2015.
French Search Report and Written Opinion for French Application No. FR 1358659 dated May 20, 2014.

* cited by examiner

SPOILER FOR A TAILGATE OF A MOTOR VEHICLE

CROSS-REFERENCE TO RELATED APPLICATIONS

This application is the U.S. National Phase application of PCT Application No. PCT/FR2014/052204 filed on Sep. 5, 2014, which claims priority to French Application No. 1358659 filed on Sep. 9, 2013, the contents of each of which are incorporated herein by reference.

The invention relates to the field of the automobile, and more particularly the field of spoilers made of thermoplastic material for a tailgate of a motor vehicle.

A spoiler is a bodywork part designed to improve the aerodynamics of the vehicle to which this part is attached. Spoilers are generally used for aesthetic aspects (style) of the vehicle. They are located and attached in the upper part of the tailgate, just above the upper edge of the rear window. The rear window is assembled to the tailgate by a bonding operation which both attaches the rear window and provides a seal. To preserve the integrity of the adhesive seal, generally deposited as a continuous bead, the rear window must be brought up and positioned and the adhesive pressed by an incident path almost perpendicular to the bonding track: in view of this assembly constraint, the approach path used to bring the rear window into position must not interfere with another neighbouring element, in particular the spoiler.

A first spoiler concept is known, according to which the spoiler skin (custom and aerodynamic part) is attached directly to the tailgate box, before bonding the rear window, and may help to structurally reinforce the tailgate by its peripheral bonding. The advantage of the spoiler according to this concept is that it is limited to a single part, the skin.

However, the prominence of the projecting part of the spoiler above the rear window towards the rear of the vehicle is limited by the approach path used to bring the rear window into position for bonding. The designer and the aerodynamics specialist do not have complete freedom as to the distance that this projecting part extends. In addition, due to the order in which the spoiler and then the rear window are assembled, the upper edge of the rear window remains visible: the result is a highly visible gap criticised in terms of appearance (perceived quality) between the upper edge of the rear window and the lower edge of the projecting part of the spoiler. Finally, the skin is not supported and is therefore highly deformable. With this concept, the distance that the projecting part of the spoiler (prominent part above the rear window) extends towards the rear of the vehicle must be limited with respect to the approach path used to bring the rear window into position for bonding.

A second spoiler concept is known, according to which the spoiler also comprises a lining part, this lining acting as reinforcement and connection with the tailgate, and forming an assembled sub-assembly, which is delivered next to the production line in the car manufacturer's factory. With this concept, this sub-assembly is also attached to the tailgate lining (metal sheet, thermosetting or thermoplastic material) but after having previously bonded the rear window on the tailgate.

However, according to this concept, the spoiler makes little or no structural contribution to the tailgate. In addition, there may be numerous assembly technologies.

Moreover, and generally, vehicles must have a third brake light. For reasons of visibility, it is highly recommended that this brake light should be located on a high point of the vehicle and centrally in the vehicle width; it is therefore very common to have to provide a location for the brake light in the spoiler, especially in its projecting part toward the rear of the vehicle.

However, a spoiler made of thermoplastic material is manufactured by injection. This moulding method is restricted in particular by the flow length parameter, as illustrated on FIG. 1, which limits the distance travelled in the mould by the injected material. Due to the shapes to be added to integrate the housing and attachment of the brake light into the spoiler skin, the distance that the projecting part of the spoiler extends cannot be as long as that desired by the style or aerodynamics of the vehicle.

The invention aims to overcome these disadvantages by proposing a spoiler having an extended thermoplastic projecting part and supported by an element for reinforcement (4) and attachment to the tailgate, in order to accommodate a brake light.

The invention therefore relates to a spoiler for a tailgate of a motor vehicle comprising:
  a custom skin providing the spoiler with an external appearance and projecting towards the rear of the vehicle so as to improve the aerodynamics and/or the style of the vehicle; and
  an element for reinforcing the custom skin, which is secured to the custom skin, comprising means for attaching to the tailgate, and comprising towards the rear of the vehicle at least one recess which can accommodate technical equipment. The custom skin and the reinforcing element can be made of thermoplastic material.

Preferably, the reinforcing element (4) has at its base towards the rear of the vehicle a recess whose shape and dimensions are chosen to allow an approach path for the rear window that is substantially perpendicular to a mean plane of a bonding track located on a box of the tailgate, when bonding the rear window on the tailgate.

Preferably, the reinforcing element is adapted to form a hollow body with the box once attached to the tailgate.

According to the invention, the reinforcing element (4) may comprise, preferably at the area projecting towards the rear of the vehicle, at least one concave shape, for example a notch cooperating with at least one complementary convex shape, for example a rib of the custom skin (3) adapted to guide, position and secure the custom skin (3) on the reinforcing element (4).

According to the invention, the custom skin (3) has, preferably at its edge located towards the front of the vehicle, a means for attaching to the tailgate towards the front of the vehicle. For example, the custom skin (3) may have removable positive fasteners such as screws or peel pop rivets.

The invention will be better understood on reading the accompanying figures, which are given solely by way of example and not limiting in any way, in which.

Figure 1:
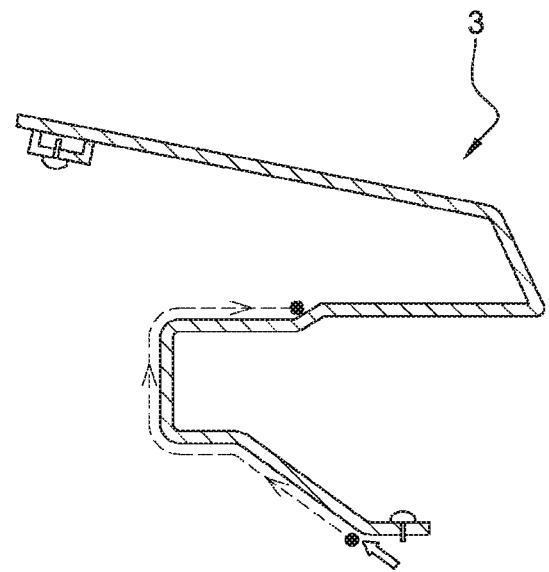
FIG. 1 illustrates the problem related to the injection process for making a spoiler.
Figure 1:
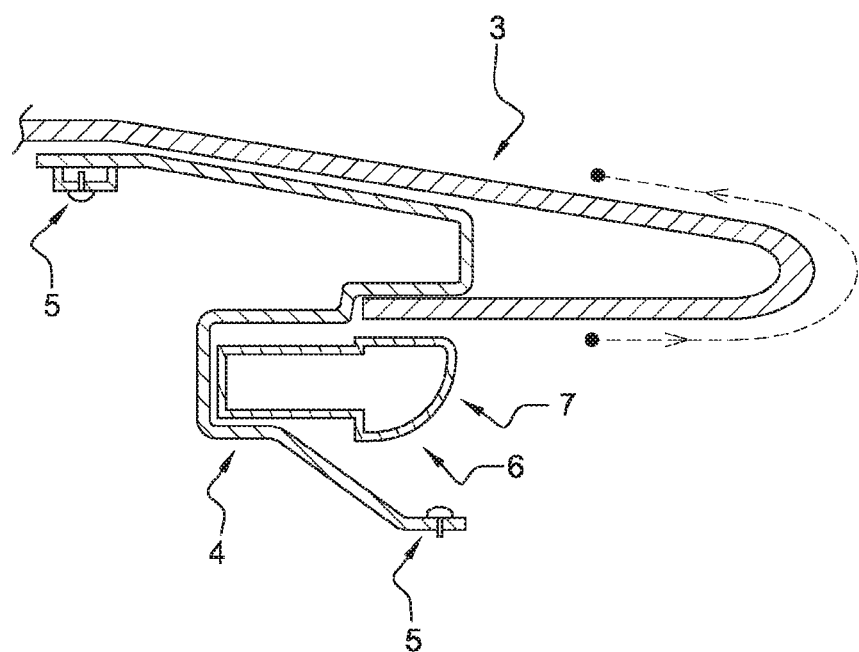
Figure 2:
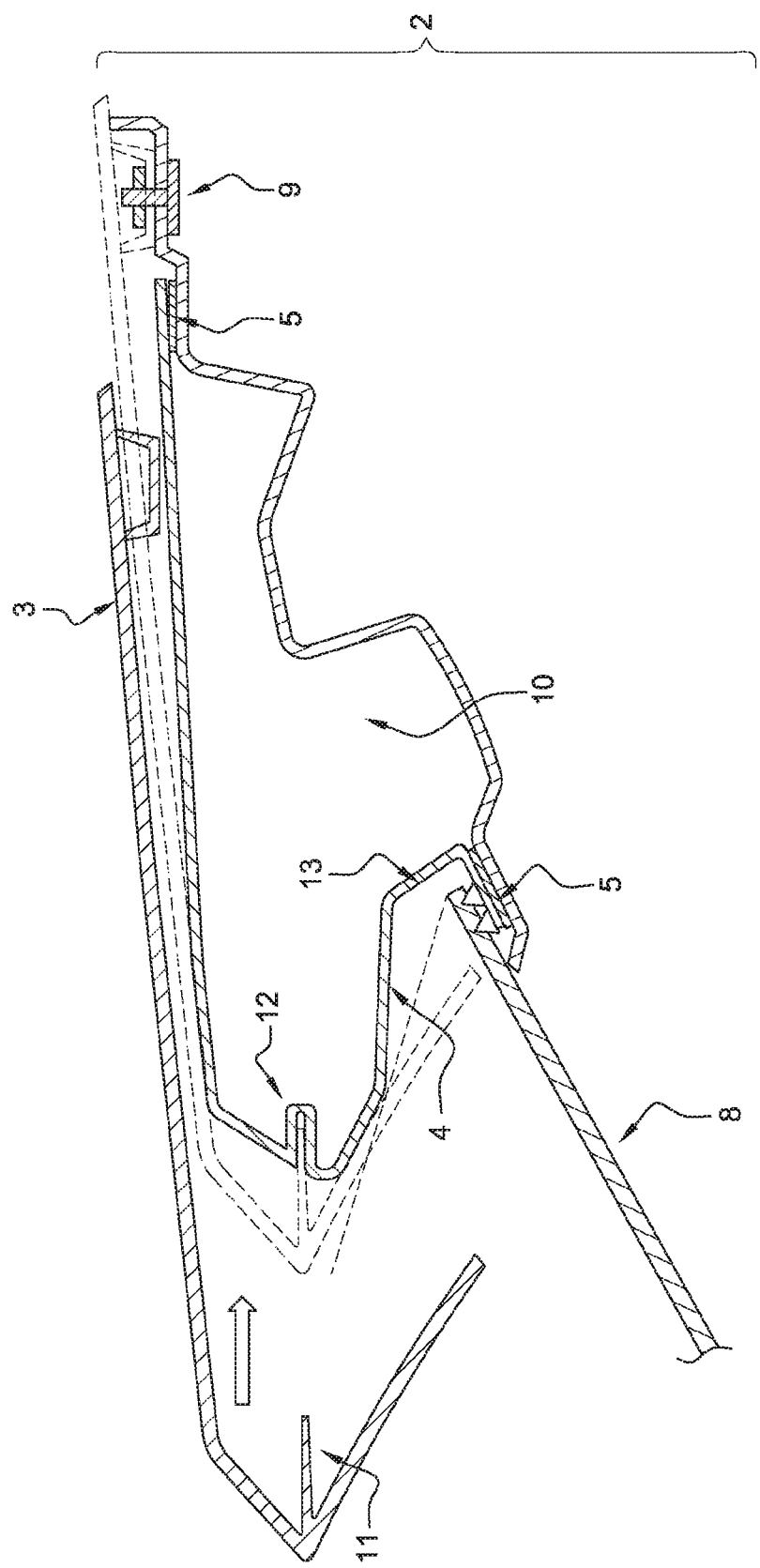
FIG. 2 illustrates a spoiler according to the invention.

Referring now to FIGS. 1 and 2.

The spoiler (1) for a tailgate (2) of a motor vehicle, extends laterally relative to the vehicle body, across the width of the vehicle. It comprises:
  a custom skin (3) providing the spoiler with an external appearance and projecting towards the rear of the vehicle; and
  an element (4) for reinforcing the custom skin (3), which is secured to the custom skin (3), comprising means (5)

for attaching to the tailgate, and comprising towards the rear of the vehicle at least one recess (6) which can accommodate technical equipment (7).

Due to its recess (6), the reinforcing element (4) forms an interface for technical equipment (7), such as a third brake light.

According to the invention, since the injected custom skin only provides the aerodynamic and aesthetic functions of the vehicle, and no longer needs to accommodate technical equipment, the projecting part can extend further towards the rear of the vehicle depending on the style and aerodynamic requirements, being less constrained by the flow length parameter inherent to the injection moulding process. This design allows the length of the projecting part to be substantially increased, without being obstructed in the approach path for the rear window (8).

According to one embodiment, the reinforcing element (4) preferably has at the area projecting towards the rear of the vehicle, at least one concave shape cooperating with at least one complementary convex shape of the custom skin (3) adapted to guide, position and secure the custom skin (3) on the reinforcing element (4).

For example, the reinforcing element (4) may comprise at least one notch (12) cooperating with at least one rib (11) of the custom skin (3). Preferably, the notch (12) and the rib (11), once fitted together, position the skin and the reinforcement element together and prevent any relative vertical movement, for example by being oriented horizontally. The notch (12) and the rib (11) can either be continuous along the rear edge of the spoiler or discontinuous. The projecting shapes of the skin and of the reinforcing element have equivalent shapes, respectively concave and convex, which can fit together and are positioned together by the notch/rib system and the pressure on the sides of the projections of each part. Preferably, the rib (its foot) comes from a style line.

In addition to this securing means, the custom skin (3) may include a means (9) for attaching to the tailgate (2) towards the front of the vehicle. These means may consist of removable positive fasteners such as screws or peel pop rivets, so as to be attached to the tailgate.

The custom skin (3) is preferably made of thermoplastic material.

The reinforcing element (4) can be made of thermosetting material or thermoplastic material.

For the custom skin (3) or for the reinforcing element (4), the thermoplastic material may be selected from the following materials:
- polypropylene (PP);
- polyamide (PA);
- polyethylene (PE);
- acrylonitrile butadiene styrene (ABS);
- polyethylene terephthalate (PET);
- polystyrene (PS);
- polycarbonate (PC);
- polymethylmethacrylate (PMMA);
- as well as all variants and all combinations of these materials or variants.

The rear window (8) is assembled to the tailgate by a bonding operation which both attaches the rear window (8) and provides a seal. To preserve the integrity of the adhesive seal, generally deposited as a continuous bead, the rear window (8) must be approached and positioned and the adhesive pressed by an incident path almost perpendicular to the bonding track.

Thus, the reinforcing element (4) preferably has at its base towards the rear of the vehicle, i.e. in the area where it is attached to the tailgate close to the rear window (8), a recess (13) whose shape and dimensions are chosen to allow an approach path for the rear window (8) that is perpendicular to the tailgate (2) during its final approach to bond the rear window (8) on the tailgate (2). For example, the recess may define a volume for positioning and final pressing of the rear window by translation or rotation (insertion type). Preferably, the shape and dimensions are also selected to hide the top edge of the rear window (8) by the bottom wall of the skin projection.

According to one embodiment, the reinforcing element (4) is adapted to form a hollow body (10), once attached to the tailgate (2).

According to another embodiment, the reinforcing element (4) forms a closing part on the tailgate (2) by forming a hollow body or box (10). In this way, the reinforcing element (4) makes the section of the tailgate (2) between the hinges more rigid. It then forms a beam with hollow body.

Preferably this box is sealed, so that the technical equipment (7) of the reinforcing element (4) can be electrical equipment such as a brake light. The brake light is then mounted from the outside of the vehicle.

In the manufacturing process, the reinforcing element (4) is secured to the tailgate (2), for example by bonding, and then the rear window (8) is bonded to the tailgate (2).

Finally, the custom skin is attached to the reinforcing element (4) and optionally also to the tailgate (2).

The invention claimed is:

1. A spoiler for a tailgate of a motor vehicle, the spoiler comprising:
   a custom skin projecting towards a rear of the vehicle; and
   a reinforcing element directly attached to the custom skin and configured to reinforce the custom skin, the reinforcing element including means for attaching to the tailgate and including towards the rear of the vehicle at least one recess; and
   a combination of the reinforcing element and the tailgate defining a hollow body therein.

2. The spoiler according to claim 1, wherein the custom skin includes thermoplastic material.

3. The spoiler according to claim 1, wherein the reinforcing element includes thermoplastic material.

4. The spoiler according to claim 1, wherein the reinforcing element has a base and, at the rear of the vehicle, the base has a recess which shape and dimensions allow an approach path for a rear window that is substantially perpendicular to a mean plane of a bonding track located on a box of the tailgate, when the rear window is bonded to the tailgate.

5. The spoiler according to claim 1, wherein the reinforcing element comprises at least one concave shape cooperating with at least one complementary convex shape of the custom skin, said concave and convex shapes being adapted to guide, position and secure the custom skin on the reinforcing element.

6. The spoiler according to claim 5, wherein the reinforcing element comprises at least one notch configured to be coupled with at least one rib of the custom skin.

7. The spoiler according to claim 1, wherein the custom skin comprises a means for attaching to the tailgate towards the front of the vehicle.

8. The spoiler according to claim 7, wherein the custom skin comprises removable positive fasteners.

9. The spoiler according to claim 8, wherein the removable positive fasteners comprise at least one of screws and peel pop rivets.

10. A spoiler for a tailgate of a motor vehicle, the spoiler comprising:

a custom skin projecting towards a rear of the vehicle; and
a reinforcing element directly attached to the custom skin and to the tailgate;
a combination of the reinforcing element and the tailgate defining a hollow body therein; and
the reinforcing element including at least one recess in a direction of the rear of the vehicle.

11. The spoiler according to claim 10, wherein a base of the reinforcing element has a recess configured to allow an approach path for a rear window that is substantially perpendicular to a plane of a bonding track located on the tailgate when the rear window is attached to the tailgate.

\* \* \* \* \*

UNITED STATES PATENT AND TRADEMARK OFFICE
CERTIFICATE OF CORRECTION

| | | |
|---|---|---|
| PATENT NO. | : 9,902,437 B2 | Page 1 of 1 |
| APPLICATION NO. | : 14/917308 | |
| DATED | : February 27, 2018 | |
| INVENTOR(S) | : Jean-Yves Demange et al. | |

It is certified that error appears in the above-identified patent and that said Letters Patent is hereby corrected as shown below:

On the Title Page

(71) Applicant should read: Compagnie Plastic Omnium, Lyon (FR)

(72) Inventors should read: Jean-Yves Demange, Amberieu en Bugey (FR); Philippe Coudron, Caluire & Cuire (FR); Bertrand Hache, Saint Cyr (FR); Martin Struss, Bratislava (SK); and Samuel Coutanceau, Lyon (FR)

(73) Assignee should read: Compagnie Plastic Omnium, Lyon (FR)

Signed and Sealed this
Twenty-ninth Day of May, 2018

Andrei Iancu
*Director of the United States Patent and Trademark Office*